US012794569B2

(12) United States Patent
Moorefield, Jr. et al.

(10) Patent No.: US 12,794,569 B2
(45) Date of Patent: Nov. 10, 2026

(54) INTERACTING WITH COLLABORATIVE WORKSPACE DEVICES USING BODY AREA NETWORKS

(71) Applicant: Cisco Technology, Inc., San Jose, CA (US)

(72) Inventors: Wayne Elmer Moorefield, Jr., Midlothian, VA (US); Vikas Vashisht, Morrisville, NC (US); William Sterling Alexander, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 328 days.

(21) Appl. No.: 18/541,769

(22) Filed: Dec. 15, 2023

(65) Prior Publication Data

US 2025/0202599 A1 Jun. 19, 2025

(51) Int. Cl.
*H04W 12/50* (2021.01)
*H04B 13/00* (2006.01)

(52) U.S. Cl.
CPC .......... *H04B 13/005* (2013.01); *H04W 12/50* (2021.01)

(58) Field of Classification Search
USPC ............................................ 455/100, 95, 91
See application file for complete search history.

(56) References Cited

U.S. PATENT DOCUMENTS 9,730,255 B1 8/2017 Chu et al.
11,049,348 B1 6/2021 Fernandez et al.
11,095,659 B2 8/2021 Schirdewahn et al.
11,227,481 B1 * 1/2022 Bran .................... G08B 21/245
11,831,650 B2 11/2023 Schirdewahn et al.
2015/0077224 A1 3/2015 Pal
2016/0259451 A1 * 9/2016 Bau ..................... G06F 3/04182
2016/0261654 A1 9/2016 Trinh et al.
(Continued)

OTHER PUBLICATIONS

Aufranc J-L., "The Wi-R Protocol Relies on Body for Data Communication, Consumes up to 100x less than Bluetooth," CNX Software—Embedded Systems News, Feb. 7, 2023, 18 Pages.
(Continued)

*Primary Examiner* — Akwasi M Sarpong
*Assistant Examiner* — Gabrielle N Dai
(74) *Attorney, Agent, or Firm* — Edell, Shapiro & Finnan, LLC

(57) ABSTRACT

Provided herein are techniques that facilitate interactions with and/or control of devices provided for collaborative workspaces using body area network communications. In one example, a method is provided that may include, upon a touch of a user with a collaboration device, performing, for a user device that provides a body area network for the user, a pairing exchange facilitated via the body area network for pairing the user device and the collaboration device. During the touch of the user with the collaboration device, the method may include transmitting a user token to the collaboration device via the body area network. The method may further include transmitting a pairing communication to a collaboration service in which the communication includes the user token and a pairing token for the device and, upon successful authentication of the user by the collaboration service, pairing the user device with the collaboration device.

20 Claims, 9 Drawing Sheets

(56) References Cited

U.S. PATENT DOCUMENTS

| | | | | |
|---|---|---|---|---|
| 2018/0352439 | A1* | 12/2018 | Russell | H04W 12/009 |
| 2021/0136129 | A1 | 5/2021 | Ponnusamy et al. | |

OTHER PUBLICATIONS

Displax Sense: "Digital Whiteboard with Markers and Eraser," https://displax.com/collaboration/sense/, retrieved on Oct. 3, 2023, 13 Pages.
Maity S., et al., "BodyWire-HCI : Enabling New Interaction Modalities by Communicating Strictly During Touch Using Electro-Quasistatic Human Body Communication", ACM Transactions on Computer-Human Interaction, vol. 27, No. 6, Article 39, https://doi.org/10.1145/3406238, Nov. 8, 2020, 25 Pages.
Parks Associates: "17% of US Internet Households Now Own an Apple Watch," Press Releases, https://www.parksassociates.com/blogs/press-releases/02012022, Jan. 31, 2022, 5 Pages.
Perfanov V.K., et al., "Automatically Tag Whiteboard Authors," Technical Disclosure Commons, Defensive Publications Series, https://www.tdcommons.org/dpubs_series/3490, Aug. 3, 2020, 6 pages.
Purdue University: "Tech Makes It Possible to Digitally Communicate Through Human Touch," Purdue University News, https://www.purdue.edu/newsroom/releases/2020/Q4/tech-makes-it-possible-to-digitally-communicate-through-human-touch.html, Dec. 3, 2020, 9 Pages.
Schurmann D., et al., "BANDANA—Body Area Network Device-to-device Authentication using Natural gAitm," arXiv:1612.03472v1 [cs.CR], Dec. 11, 2016, 11 Pages.
Sen S., "Wi-R Technology White Paper," Ixana, https://ixana.ai/blogs/Wi-R_Technology_White_Paper.html, Jan. 6, 2023, 8 Pages.
Globe Newsire, "Ixana Unveils the World's First Wi-R Silicon Chip to Seamlessly Communicate with Touch," Your Erie, Jan. 3, 2023, 5 Pages.
Ixana.Ai, "Wi-R Communicate with Touch: Stream Music," Vimeo, https://vimeo.com/785792262, retrieved on Oct. 3, 2023, 6 Pages.
Wu Y., et al., "Poster Abstract: Learning for Device Pairing in Body Area Networks," Research Gate, Conference Paper, https://www.researchgate.net/publication/328549119, Nov. 2018, 3 Pages.

* cited by examiner

INTERACTING WITH COLLABORATIVE WORKSPACE DEVICES USING BODY AREA NETWORKS

TECHNICAL FIELD

The present disclosure relates to network equipment and services associated with collaborative workspaces.

BACKGROUND

There are many different types of devices that can be utilized in collaborative workspace environments, such as digital whiteboards, telecommunication devices, audio input/output devices, video devices, and the like. For collaborative sessions involving multiple participants utilizing a workspace, it can be difficult to manage the access or control of devices within the workspace during such sessions. Thus, there are opportunities to improve the management or control of collaboration devices that may be utilized during collaborative workspace sessions.

DETAILED DESCRIPTION

Overview

Figure 1:
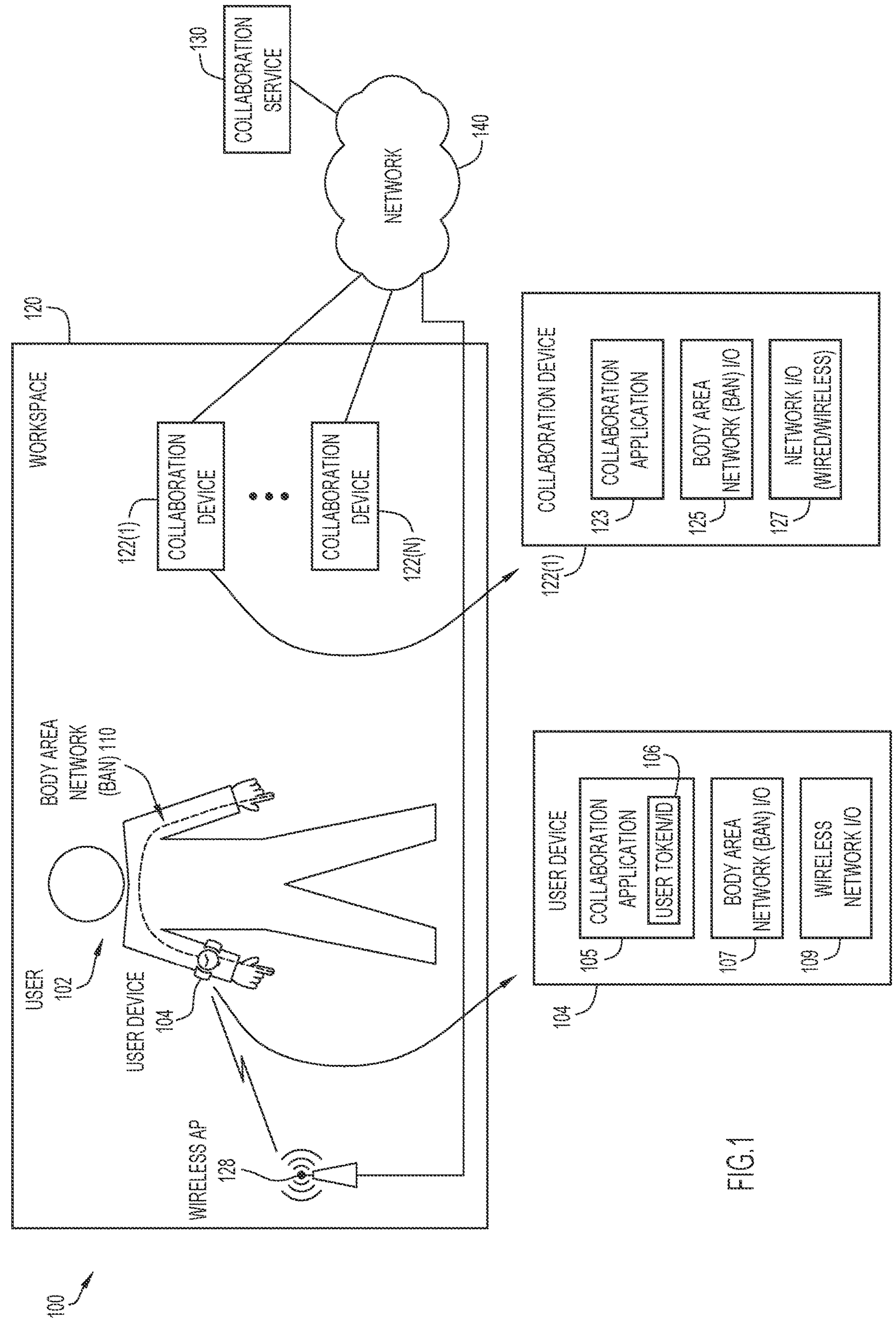
FIG. 1 is a block diagram of a system in which interactions with collaborative workspace devices can be facilitated through body area network communications, according to an example embodiment.

Embodiments herein may provide techniques for interacting with devices provided for collaborative workspaces (e.g., a physical room, cubicle, or the like) using body area network communications. Devices provided for collaborative workspaces may include collaboration devices with which participants involved in a collaborative session can interact during a session, such as digital whiteboards, audio/video encoders/decoders (codecs), such as microphones, speakers, etc., video cameras, video display devices, telecommunication devices, room scheduling devices, and/or the like as well as collaboration device controllers, such as a controller for a workspace, also referred to interchangeably herein as a 'room controller', that may be paired with and manage/control different collaboration devices within a workspace (e.g., a controller to manage/control video displays, cameras, microphones, telecommunication devices, etc.).

Broadly, body area network (BAN) communications may include any electro-quasistatic human body communications that may facilitate bidirectional communications between a user device that is in contact with the skin of a user and one or more external BAN-capable communication device, such as collaboration devices/controllers, in which the BAN communications are performed through touches of the user with the external BAN-capable communication devices. During a touch of a user that is wearing/touching a BAN-capable user device, such as a smart watch, phone, patch, etc., with an external BAN-capable device, BAN communications can utilize the body of the user as a conductive medium through which BAN communications can traverse to/from the user device for communications with the external device(s). One example of BAN communications that may be utilized in combination with embodiments herein may include body area network communications that use the so-called 'Wi-R' protocol developed and marketed by Ixana, Inc.

Interactions involving body area network communications and collaboration workspace devices as provided via embodiments herein may include, but not be limited to, any combination of interactions to facilitate pairing one or more devices for use during a collaborative session (e.g., facilitating pairing between a user device with one or more collaboration devices, facilitating pairing between a room controller and one or more collaboration devices of a workspace), collaborative content interactions involving collaboration devices (e.g., identifying/tracking user interactions/marks made by a user on a digital whiteboard or the like), and/or user control/management/access interactions involving devices/controllers (e.g., facilitating different levels of actions/privileges for user interactions with devices) that may be used to tailor user experiences when interacting with devices/controllers for a workspace.

In one instance, a method is provided that may include upon a touch of a user with a collaboration device, performing, for a user device that provides a body area network for the user, a pairing exchange for pairing the user device and the collaboration device, wherein the pairing exchange is facilitated via the body area network and comprises, during the touch of the user with the collaboration device, transmitting a user token to the collaboration device; transmitting a pairing communication to a collaboration service that manages a collaboration session with the collaboration device, the pairing communication comprising the user token and a pairing token for the collaboration device; and upon successful authentication of the user by the collaboration service, based on the pairing communication, pairing the user device with the collaboration device.

In another instance, another method is provided that may include for a user device that provides a body area network for a user, obtaining by the user device via the body area network during a first touch by the user with a collaboration device controller that is to be paired with one or more collaboration devices, pairing information for the collaboration device controller; and transmitting, during a second touch by the user with a particular collaboration device of the one or more collaboration devices, a pairing request to the particular collaboration device via the body area network, the pairing request comprising the pairing information for the collaboration device controller and an identifier for the user for pairing the collaboration controller with the particular collaboration device.

Example Embodiments

Referring to FIG. 1, FIG. 1 is a block diagram of a system 100 in which interactions with collaborative workspace devices can be facilitated through body area network communications, according to an example embodiment. As shown in FIG. 1, system 100 may include a physical collaborative workspace, such as a workspace 120, a collaboration service 130, and a network 140.

Workspace 120 may be inclusive of any physical space, such as a room, cubicle, or the like that may be utilized during a collaborative session (e.g., a meeting, conference, etc.) involving one or more session participants or users. As shown in FIG. 1, workspace 120 may include at least one workspace user, such as a user 102, any number of collaboration devices, such collaboration devices 122(1)-122(N), and at least one wireless access point (AP), such as a wireless AP 128.

User 102 may be wearing or otherwise in contact with (e.g., holding) a user device 104 that is considered to be a body area network-capable device capable of providing/facilitating a body area network (BAN) 110 for user 102 in accordance with embodiments herein. User device 104 may be inclusive of a smart watch, a smart phone, an electronic patch and/or the like that is in contact the skin of user 102 in order to facilitate BAN communications in accordance with embodiments herein. In some instances, user device 104 may be characterized as a personal, Bring-Your-Own-Device (BYOD) electronic device belonging to user 102.

As shown in FIG. 1, user device 104 may be configured with collaboration application logic (e.g., software, instructions, etc.), shown in FIG. 1 as collaboration application 105, body area network input/output (I/O) elements, shown in FIG. 1 as BAN I/O 107, and wireless network I/O elements, shown in FIG. 1 as wireless network I/O 109.

Collaboration application 105 provided for user device 104 may be inclusive of any collaborative application that may be operated in combination with a collaboration service, such as collaboration service 130, that may manage one or more collaboration sessions for a user, such as user 102. In one non-limiting example, collaboration application 105 may be a WebEx® RoomOS application, as provided by Cisco System, Inc., and collaboration service 130 may facilitate/manage collaboration WebEx® RoomOS session(s) involving user 102/user device 104. WebEx® is a registered trademark of Cisco Systems, Inc. and/or its affiliates in the United States and certain other countries.

Further regarding user device 104, BAN I/O 107 may be inclusive of any hardware and/or software devices, elements, functions of user device 104 that may facilitate BAN communications via BAN 110 in accordance with embodiments herein. In various embodiments, BAN I/O may include, but not be limited to, any hardware and/or software capable of performing baseband signal processing (such as modulation/demodulation) as well as hardware (e.g., baseband processors (modems), transmitters and receivers, transceivers, and/or the like)), processors, software, logic and/or the like to facilitate signal transmissions and signal receptions via antenna assemblies (not shown) or the like in order to provide BAN communications (e.g., electro-quasistatic human body communications) involving, at least in part, the body of user 102 as the conductive medium through which BAN communications can traverse for touches of the user 102 with one or more BAN-capable external devices, such as any of collaboration devices 122(1)-122(N) shown in FIG. 1.

In some instances, BAN communications may not be limited to touch interactions involving user 102. For example, in at least some embodiments, BAN communications may involve short-range wireless communications (e.g., less than 10 centimeters) between the body of user 102 and one or more BAN-capable external devices.

In various embodiments, wireless network I/O 109 may include, but not be limited to, any hardware and/or software capable of performing baseband signal processing (such as modulation/demodulation) as well as hardware (e.g., baseband processors (modems), transmitters and receivers, transceivers, and/or the like)), software, logic and/or the like to facilitate signal transmissions and signal receptions via antenna assemblies (not shown) or the like in order to provide wireless Radio Frequency (RF) communications that may be considered long-range wireless communications (longer than the short-range BAN wireless communications), such as, but not limited to, Institute of Electrical and Electronics Engineers (IEEE) 802.11 (also referred to as Wi-Fi®) (including any variations thereof) wireless communications, Bluetooth® wireless communications, or the like.

User device 104 may further include any hardware processor(s), memory element(s), control logic and/or the like (not shown in FIG. 1) in order to facilitate operations involving user device 104. It is to be understood that collaboration application 105, BAN I/O 107, and/or wireless network I/O 109 may interact in any manner, potentially in combination with any hardware processor(s), memory element(s), and/or control logic provided for user device 104 in order to facilitate operations as discussed for embodiments herein.

Collaboration devices 122(1)-122(N) may be inclusive of any devices, sometimes referred to as 'room endpoints', that may be utilized during a collaborative session involving user 102 and workspace 120. In various embodiments, collaboration devices 122(1)-122(N) may be implemented as any combination of digital whiteboards, audio/video encoders/decoders (codecs), such as microphones, speakers, etc., video cameras, video display devices, telecommunication devices, room scheduling devices, room management devices (e.g., HVAC control, lighting control, etc.) and/or the like.

Collaboration devices 122(1)-122(N) provided in accordance with embodiments herein may be implemented as BAN-enabled devices capable of performing BAN communications with one or more BAN-capable user devices via a BAN provided for a user, such as BAN 110 provided for user 102 via user device 104. As an illustrative example, as shown in FIG. 1, collaboration device 122(1) (and any other collaboration devices discussed herein) may include collaboration application logic, shown in FIG. 1 as collaboration application 123, BAN I/O 125, and network I/O 127, which may be inclusive of any combination wired (e.g., Ethernet-based wired I/O) and/or wireless network I/O.

Collaboration application 123 provided for user device collaboration device 122(1) may be inclusive of any collaborative application that may be operated in combination with a collaboration service, such as collaboration service 130, that may manage collaboration sessions involving collaboration device 122(1) and one or more users, such as user 102. In one non-limiting example, collaboration application 123 may be a WebEx® RoomOS application, as provided by Cisco System, Inc., and collaboration service 130 may facilitate/manage collaboration WebEx® RoomOS session(s) involving user 102/user device 104 and collaboration device 122(1).

Further regarding collaboration device 122(1), BAN I/O 125 may be inclusive of any hardware and/or software devices, elements, functions of collaboration device that may facilitate BAN communications with one or more other BAN capable devices, such as user device 104, in accordance with embodiments herein. In various embodiments, BAN I/O 125 may include, but not be limited to, any hardware and/or software capable of performing baseband signal processing (such as modulation/demodulation) as well as hardware (e.g., baseband processors (modems), transmitters and receivers, transceivers, and/or the like)), processors, software, logic and/or the like to facilitate signal transmissions and signal receptions via antenna assemblies (not shown) or the like in order to receive and/or transmit BAN communications in which such BAN communications can be facilitated via any combination of one or more touch screen and/or conductive interface elements (not shown in FIG. 1) capable of registering touches and/or conducting electrical signals, such as capacitive touch screen elements, conductive surfaces (e.g., capacitive touch surfaces, metallic conducting surfaces, etc.) through which electrical signals can be transmitted/received, and/or the like, as would be understood by a person of ordinary skill in the art for collaboration device 122(1). In some instances, BAN communications provided by BAN I/O 125 may involve short-range wireless communications (e.g., less than 10 centimeters) with one or more other BAN-capable devices. A touch screen and/or display interface elements capable of registering touches and/or conducting electrical signals may be referred to interchangeably herein as a 'touch interface'.

In various embodiments, network I/O 127 may, for wireless communications, include, but not be limited to, any hardware and/or software capable of performing baseband signal processing (such as modulation/demodulation) as well as hardware (e.g., baseband processors (modems), transmitters and receivers, transceivers, and/or the like)), software, logic and/or the like to facilitate signal transmissions and signal receptions, via antenna assemblies (not shown) or the like in order to provide wireless communications that may be considered long-range wireless communications (longer than the short-range BAN wireless communications), such as, but not limited to, IEEE 802.11/Wi-Fi (including any variations thereof) wireless communications, Bluetooth® wireless communications, or the like. In various embodiments, network I/O 127 may, for wired communications, include any hardware and/or software capable of performing wired communications, such as Ethernet drivers, Ethernet ports, and/or any other I/O elements capable of facilitating wired communications.

Collaboration device 122(1) (and any other collaboration devices discussed herein) may further include any hardware processor(s), memory element(s), control logic and/or the like (not shown in FIG. 1) in order to facilitate operations involving collaboration device 122(1). It is to be understood that collaboration application 123, BAN I/O 125, and/or network I/O 127 may interact in any manner, potentially in combination with any hardware processor(s), memory element(s), and/or control logic provided for user device 104 in order to facilitate operations as discussed for embodiments herein.

Wireless AP 128 may include, but not be limited to, any hardware and/or software capable of performing baseband signal processing (such as modulation/demodulation) as well as hardware (e.g., baseband processors (modems), transmitters and receivers, transceivers, and/or the like)), software, logic and/or the like to facilitate signal transmissions and signal receptions, via antenna assemblies (not shown) or the like in order to provide wireless communications that may be considered long-range wireless communications (longer than the short-range BAN wireless communications), such as, but not limited to, IEEE 802.11/Wi-Fi (including any variations thereof) wireless communications, Bluetooth® wireless communications, or the like. Wireless AP 128 may also include any hardware and/or software capable of performing wired communications, such as Ethernet drivers, Ethernet ports, and/or any other I/O elements capable of facilitating wired communications.

Collaboration service 130 can manage collaboration sessions involving users/user devices, collaboration devices, and, in some instances, collaboration device controllers, in accordance with embodiments herein. For example, in at least one embodiment, collaboration service 130 can facilitate authentication/authorization operations for collaboration sessions involving users, such as user 102/user device 104, as well as for various pairing operations, as discussed for various embodiments herein. As shown in FIG. 1, collaboration devices 122(1)-122(N), wireless AP 128, and collaboration service 130 can interface with network 140, which may facilitate interactions/communications involving various elements of FIG. 1 in accordance with embodiments herein. In various embodiments, network 140 may be inclusive of any local area network (LAN), wide area network (WAN) (e.g., the public Internet, cloud network(s), etc.), combinations thereof, and/or the like that may facilitate any combination of wired and/or wireless communications.

As shown in FIG. 1, during operation of system 100, upon user 102 logging into collaboration application 105 via communications with collaboration service 130, a user token, user identifier (ID), or the like that provides an unambiguous identity of the user 102 can be generated and stored via user device 104. For example, a user token/ID 106 is shown in FIG. 1, which can be stored by/in association with collaboration application 105, in which user token/ID 106 can be utilized for various operations as discussed in further detail herein.

As noted above, embodiments herein may facilitate various interactions between users/user devices, such as user 102/user device 104, and one or more collaboration devices, such as collaboration device 122(1), during a collaboration session. For example, in shared collaborative spaces, such as workspace 120, at least one collaboration device, such as collaboration device 122(1) may be implemented as a digital whiteboard, such as a Board Pro® device, as provided by Cisco. Board Pro® is a registered trademark of Cisco Systems, Inc. and/or its affiliates in the United States and certain other countries.

In such a scenario involving a digital whiteboard, when multiple people/users are contributing content to an idea on the same digital whiteboard device (e.g., via digital marks, via digital sticky notes, etc.) during a collaboration session, session participants may not be able to easily identify (e.g., during/after the session) which digital whiteboard content belongs to which users. In a scenario in which the digital whiteboard content is shared to a remote participant, the remote participant may be unable to identify which local participant/contributor added which content. Although the identity of a contributor may be known through social paradigms, such as only one person at the whiteboard at a time, such social paradigms do not provide post-session information regarding which participant contributed to which parts of a complete collaborative effort.

In accordance with embodiments herein, the use of BAN communications between user devices of specific users, such as user 102/user device 104, and collaboration devices, such as collaboration device 122(1) can be utilized to trigger authentication operations involving collaboration service 130 that can facilitate pairing user device 104 and collaboration device 122(1) for a collaboration session involving user device 104 and collaboration device 122(1).

For an implementation in which collaboration device 122(1) is implemented as a digital whiteboard, such pairing with user device 104 can be utilized in order to identify touch interactions (involving BAN 110) with the digital whiteboard provided by user 102, in which the identity of user 102 can be attributed to the touch interactions or, broadly, digital/collaboration content, provided by the user 102 to the digital whiteboard. The identity of user 102 in combination with the touch interactions/content provided by the user 102 to the digital whiteboard can be stored locally via collaboration device 122(1) and/or communicated to/stored by collaboration service 130.

Figure 2:
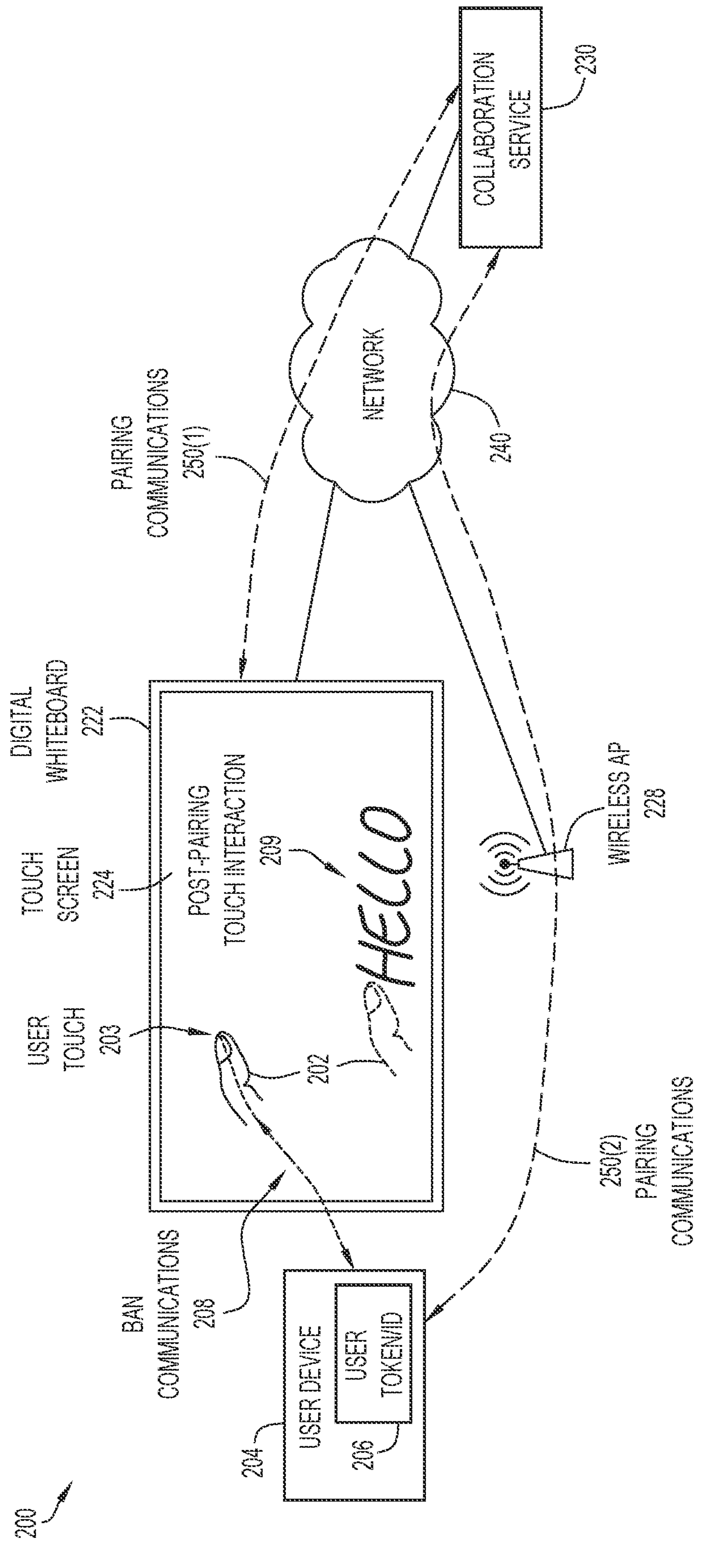
FIG. 2 is a block diagram illustrating example interactions can be facilitated through body area network communications involving a digital whiteboard, according to an example embodiment.

Consider an example scenario involving a digital whiteboard 222, as shown in FIG. 2, which is a block diagram 200 illustrating example interactions that can be facilitated through body area network communications involving digital whiteboard 222 in order to facilitate pairing the digital whiteboard 222 with a user device, according to an example embodiment.

FIG. 2 includes a user device 204 for user 202 (partially shown as a finger for FIG. 2), a wireless AP 228, a network 240, and a collaboration service 230. Although not shown in FIG. 2, it is assumed that user device 204 is configured to include a collaboration application, BAN I/O, and wireless I/O as discussed for wireless device 104 of FIG. 1, such that a user token/ID can be provided for user device 204 for a collaboration session involving collaboration service 230. Further, although not shown in FIG. 2, it is assumed that digital whiteboard 222 includes a touch screen 224 and is configured to include a collaboration application, BAN I/O, and network I/O as discussed above for collaboration device 122(1) in which each of the collaboration application, BAN I/O, and/or network I/O can interface with touch screen 224 in order to facilitate various operations as discussed herein.

During operation in accordance with embodiments herein, when user 202 touches the touch screen 224 of digital whiteboard 222 (as generally shown via user touch 203), a pairing exchange can be facilitated between the user device 204 and the digital whiteboard 222 can be initiated, via BAN communications, as generally shown at 208, in order to trigger pairing the user device 204 with the digital whiteboard 222.

In at least one embodiment for the pairing exchange involving BAN communications (208), the user token/ID 206 for user 202 can be shared with the digital whiteboard 222, which can initiate pairing communications, as generally shown at 250(1), with collaboration service 230 (via network 240) such that the digital whiteboard 222, via collaboration service 230, can authenticate the identity of the user 202 (using the user token/ID 206), using existing authentication mechanisms, as often used for hot desking, etc.

Pairing between a user device and a collaboration device for a given workspace is not limited to pairing communications performed between a collaboration device and a collaboration service. For example, in at least one embodiment for the pairing exchange involving BAN communications (208), the user token/ID 206 for user 202 can be provided to the digital whiteboard 222, which can trigger the digital whiteboard 222 to provide a pairing token (not shown) to the user device 204, which can then initiate pairing communications, as generally shown at 250(2), with collaboration service 230 (via wireless AP 228/network 240), in which the collaboration service 230 can authenticate the identity of the user 202 (using the user token/ID 206) for pairing the user device 204 with the digital whiteboard 222. The pairing token for the digital whiteboard 222 can unambiguously identify the digital whiteboard 222 to the collaboration service 230 (e.g., via a Media Access Control (MAC) address for the digital whiteboard, an equipment identifier for the digital whiteboard, or the like).

Upon successful authentication of the user 202 by collaboration service 230 for pairing the user device 204 with the digital whiteboard 222 (for pairing performed by digital whiteboard 222 or by user device 204), a pairing success indication (e.g., a message) can be transmitted by the collaboration service to the digital whiteboard 222, which can trigger the digital whiteboard to store the user token/ID 206 for subsequent touch interactions involving the user 202. In at least one embodiment, the pairing success indication can include the user token/ID 206 for user 202.

For example, as shown in FIG. 2, consider that user 202 performs a post-pairing touch interaction, as generally shown at 209, in which the user writes "HELLO" on the digital whiteboard 222. Once user device 204 is successfully paired with digital whiteboard 222, content marks and contributions to the digital whiteboard, such as shown at 209, can be stored in association with the user 202.

Although only one user is illustrated for the example of FIG. 2, such techniques can allow for multiple users to touch, be identified, and then each be attributed to content/additions to a collaborative effort. In some embodiments, a collaboration device can store or cache the identities of multiple participants/user devices paired with the collaboration device for a given collaboration session in order to limit authentications performed for different touches/interactions among different users participating in a session. Further, in some embodiments, user content/additions could be tagged with the identity of the corresponding user that provided different content/additions in which the tags could be provided to remote users.

User identification of content provided for a digital whiteboard can be provided through a variety of techniques. For example, in some embodiments, user identification of content provided by a particular user could be provided using unique visual identification(s), such a particular font, color, line thickness, line style, or the like, as may be defined by the particular user and/or by an enterprise that may manage policies/privileges for the user. In some embodiments, content provided by a particular user to a digital whiteboard could be converted to audio (e.g., using text recognition and text to speech conversion mechanisms), which could be provided to local and/or remote participants (e.g., for vision impaired participants).

Further, user identification for content provided for a digital whiteboard by a given user can be provided through any combination of identification techniques, such as a name of the user (e.g., a formal name, a nickname, a handle, etc.), a picture of the user, and/or the like.

As noted above, in at least one embodiment, a pairing success indication provided to a collaboration device, such as digital whiteboard 222, can include the user token/ID for a given user for which pairing authentication is successful. In some embodiments, a pairing success indication can further include one or more user policies for a given user for which pairing authentication is successful. In various embodiments, user policies for a given user may include any combination of one or more privileges that are allowed/enabled and/or disabled for the user for interacting with the collaboration device and/or user preferences as provided by the user for interacting with/controlling the collaboration device. For example, in at least one embodiment, user privileges for a given user may identify whether the user is allowed administrative level access to manage/control a device. In at least one embodiment, user privileges may be based on a role (e.g., administrator, general contributor, host, combinations thereof, etc.) assigned to a given user, potentially for a given collaboration session and/or for multiple sessions. Such use of user privileges may provide for the ability to tailor user experiences for interacting with devices/controllers provided for a workspace.

For example, at least one embodiment, a privilege for a given user may disable the user's ability to add and/or edit content through touch interactions with the digital whiteboard 222 while a privilege for another user may enable the other user's ability to add/edit content for the digital whiteboard. In such an embodiment, the other user may be considered to lack edit privileges regarding adding/editing content for the digital whiteboard 222. In at least one embodiment, a first privilege for a given user may disable the user's ability to add/edit content for touch interactions with the digital whiteboard, while a second privilege for the given user may enable user's ability to given user's ability to manipulate one or more views of the digital whiteboard through touch interactions with the digital whiteboard 222 (e.g., pan or zoom an area of the digital whiteboard 222). Thus, embodiments herein may advantageously provide for the ability to limit touch interactions for a given user regarding the adding and/or editing of content for a digital whiteboard. The ability to distinguish different types of touch interactions/operations/features with regarding to enabling/disabling such through the use of privileges can be extended to any type of collaboration device in accordance with embodiments herein.

In at least one embodiment, user preferences for a given user may include that preferences that configure the unique visual identification of the user for interactions by the user with the collaboration device (e.g., font, color, line style/thickness, etc. for user interactions involving digital whiteboard 222). In another embodiment, user preferences for a given user may include settings for a collaboration device (e.g., menu settings, font, layout, etc.) for interactions between the user and the collaboration device.

Figure 3:
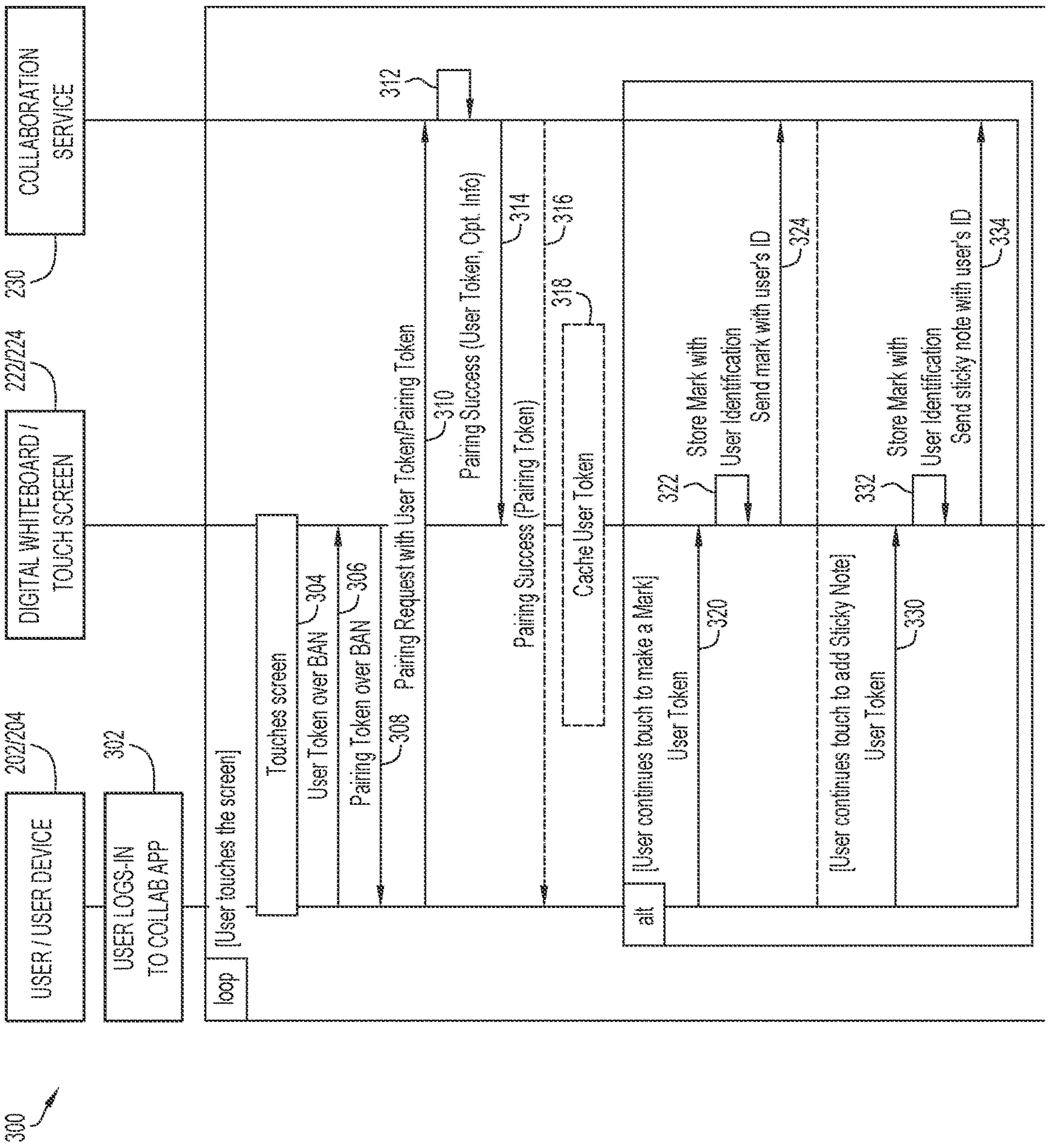
FIG. 3 is a ladder diagram illustrating various example operations that can be utilized to facilitate pairing a user device with a digital whiteboard and tracking user interactions with digital whiteboard through body area network communications, according to an example embodiment.

Consider various pairing operations that may be performed to facilitate pairing between a user device and a collaboration device via various body area network communications in accordance with embodiments herein. For example, with reference to FIG. 3, FIG. 3 is a ladder diagram 300 illustrating example operations that can be utilized to facilitate pairing user device 204 (worn by/in contact with/held by user 202) with the digital whiteboard 222 (including touch screen 224), via collaboration server 230, and tracking user 202 interactions with digital whiteboard 222 through body area network communications, according to an example embodiment. The embodiment of FIG. 3 illustrates example operations in which pairing communications for pairing user device 204 and digital whiteboard 222 are provided by user device 204 (e.g., as generally shown at 250(2) of FIG. 2).

At 302, consider that the user 202 logs-in or otherwise signs-in to the collaboration application configured for user device 204 (which may include communications with collaboration service 230) such that a user token (e.g., user token/ID 206) is generated for the collaboration application and stored via user device 204 for a collaboration session involving user 202. Continuing with the present example, consider an operational loop through which various touch interactions that can be performed by the user 202 on the touch screen 224 of the digital whiteboard 222.

For example, as shown at 304, consider that user 202 touches the touch screen 224 of the digital whiteboard 222, which triggers a pairing exchange to be initiated/performed with the digital whiteboard 222. While the user 202 is touching the touch screen 224, as shown at 306, the pairing exchange can include the user device 204 transmitting the user token to the digital whiteboard 222 via a BAN connection/communication facilitated via the BAN provided by the user device 204 and the touch screen 224 of the digital whiteboard. As shown, at 308, the digital whiteboard 222 provides a pairing token to the user device 204 via the touch screen 224 and the BAN provided by user device 204 while the user 202 continues to touch the touch screen 224.

Thereafter, as shown at 310, the user device 204 can transmit a pairing communication to the collaboration service 230 such that the user device 204 can transmit a pairing request to the collaboration service 230 that includes the user token and the pairing token. The pairing communication/request can be transmitted by the user device 204 to the collaboration service 230 via a wireless AP, such as wireless AP 228 (not shown in FIG. 3), via a network, such as network 240 (not shown in FIG. 3). The user 202 may not be touching the touch screen 224 of the digital whiteboard 222 for the pairing communication transmitted by the user device 204.

As generally shown at 312, the collaboration service 230 can authenticate the user 202/user device 204 for pairing the user device 204 with the digital whiteboard 222 using any authentication techniques now known or hereinafter developed, as would be understood by a person of ordinary skill in the art. For example, in one instance, collaboration service 230 can check/verify that the user 202 is authorized to pair user device 204 with the digital whiteboard 222 by authenticating the user token (e.g., in comparison with a local copy of the user token stored by the collaboration service based on the log-in of the user 202 with the collaboration application) and the pairing token (e.g., to confirm the authenticity of the token, etc.).

Upon successful authentication of the user 202, the collaboration service 230 pairs the user device 204 with the digital whiteboard by transmitting to the digital whiteboard (e.g., via network 240) a pairing success indication, as shown at 314, that includes the user token for user 202. In some embodiments, the pairing success indication can include additional information, such as one or more policies for user 202, which may include any combination of privileges that are allowed/enabled for the user for interacting with the digital whiteboard 222 and/or user preferences as provided by the user for interacting with/controlling the digital whiteboard 222. In some embodiments, as shown in FIG. 3, collaboration service 230 can also transmit a pairing success indication to the user device 204, as shown at 316, that may include the pairing token.

In some embodiments, as shown in FIG. 3 at 318, the digital whiteboard 222 can cache the user token in order to facilitate quick identification of the user 202/user device 204, without again having to perform pairing operations, for tracking/recording subsequent touch interactions performed by the user 202 upon the digital whiteboard 222.

Following the pairing between user device 204 and the digital whiteboard, the user 202 can make adjustment to the content of the digital whiteboard 222, such as making digital pen/touch marks, adding digital sticky notes, etc., to the touch screen 224 of the digital whiteboard 222 and the digital whiteboard can annotate each change with an identifier of the user (e.g., user ID, name, etc.). Further, the digital whiteboard 222 can generate a transcript of the content changes made by the user and associate the user's identifier with each of the changes. The transcript can be sent to remote parties, which can see the user's changes to the digital whiteboard 222 content.

For example, as shown at, 320, consider that the user 202 subsequently touches the touch screen 224 to make a mark on the digital whiteboard 222 (e.g., writing "HELLO", as illustrated for FIG. 2) such that the user token is transmitted by the user device 204 to the digital whiteboard 222, which recognizes the user 202, based on the user token, and registers/stores the mark with identification of the user 202, as shown at 322. As shown at 324, the digital whiteboard 222 can send the mark and the user's identification (e.g., the user token) to the collaboration service 230, which can store the mark and user identification in a transcript generated for the collaboration session. In another example, similar operations can be performed, as shown at 330, 332, and 334 for a touch interaction performed by the user 202 in which the user adds a digital sticky note to the digital whiteboard.

Figure 4:
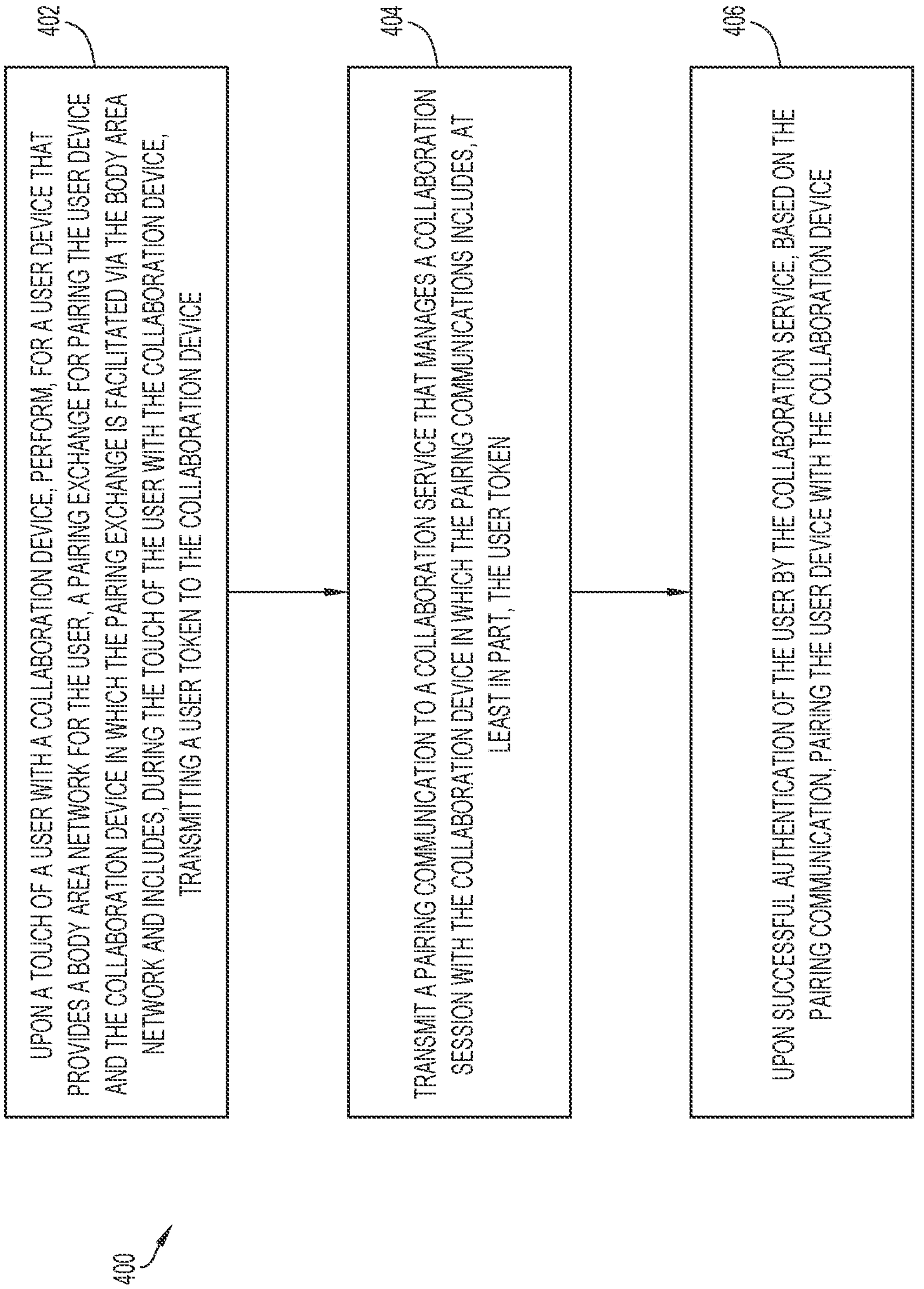
FIG. 4 is a flow diagram depicting a method associated with operations that may be performed to facilitate pairing a user device with a collaboration device through body area network communications, according to an example embodiment.

Referring to FIG. 4, FIG. 4 is a flow chart depicting a method 400 associated with operations that may be performed to facilitate pairing a user device with a collaboration device through body area network communications, according to an example embodiment. In at least one embodiment, method 400 may be performed, at least in part, by a user device, such as any of user device 104 or user device 204 as discussed for FIGS. 1-3, and/or any other user device facilitating a body area network in accordance with embodiments herein.

At 402, the method can include, upon a touch of a user with a collaboration device, performing, for a user device that provides a body area network for the user, a pairing exchange for pairing the user device and the collaboration device in which the pairing exchange is facilitated via the body area network and includes, during the touch of the user with the collaboration device, transmitting a user token to the collaboration device.

At 404, the method can include transmitting a pairing communication to a collaboration service that manages a collaboration session with the collaboration device in which the pairing communications comprises the user token and a pairing token for the collaboration device.

In some embodiments, the pairing exchange further include obtaining, by the collaboration device, the pairing token for the collaboration device during the touch of the user with the collaboration device (via the body are network provided via the user device) and transmitting the pairing communication is performed by the user device and does not involve the body area network and the pairing communication further comprises the pairing token. In some embodiments, transmitting the pairing communication is performed by collaboration device.

At 406, the method can include, upon successful authentication of the user by the collaboration service, based on the pairing communication, pairing the user device with the collaboration device.

Accordingly, embodiments herein may provide for pairing a user device with one or more collaboration devices using pairing techniques involving connections/communications provided via a body area network facilitated by the user device in which such pairing techniques are deterministic based on touch of a user with a collaboration device. Such techniques may facilitate pairing and tracking user interactions in a manner that is accurate and deterministic such that each user stroke can be authenticated/tracked (based on a user token provided to a collaboration device through pairing). Such techniques do not rely on cameras or other mechanisms for identifying users and, thus, can be used via non-video endpoint/touchscreens.

Other pairing operations can be facilitated through body area network communications in accordance with embodiments herein.

Consider, for example, conventional scenarios in which collaboration device controllers and/or room controllers are typically paired with collaboration devices provided within a given workspace. Such convention pairing operations involving device/room controllers can involve multiple steps for performing device discovery and access control to allow such collaboration devices (also sometimes referred to as 'peripherals' or 'peripheral devices') to be utilized for a collaboration session.

For example, conventional pairing operations can include, upon booting or powering on a device controller, the device controller is unpaired and scans for nearby peripheral devices on the network (e.g., using wired and/or wireless scans). If found, the devices can present their Internet Protocol (IP) address to the controller. A user can type in an IP address for connecting to a peripheral device or, if found via the scan, can select an IP address for connecting/pairing to the device. The user either has to log-in to the peripheral device itself and create an account and password for the controller to use for connection/pairing or has to log-in to the controller and select the workspace and the peripheral device to generate a pairing PIN and then log-in to the peripheral device and provide the PIN to facilitate pairing the controller with the peripheral device.

Alternatively, another way of pairing a peripheral device is by connecting to a link local network over via a switch/ethernet port that may be provided for peripheral device. For some peripherals, such as the microphone devices that may be implemented as a power over ethernet audio over IP microphone, the only way of connecting to such devices may be via a link local network connection, as such a device may not have a user interface or touch screen for inputting an IP address or credential and/or may have not have wireless I/O capabilities for pairing using a captive portal or other method. As a result, the only way to pair such a device may be through the local switch port, which may limit the ability to configure the peripheral in the ports that an administrator may desire (as the device is to be directly connected and cabling laid accordingly, rather than use existing network ports). Similar connections, may be needed for cameras, microphones, speaker arrays, etc.

Thus, a method for easily connecting peripherals to a controller device could reduce the time needed to find IPs for devices, create credentials, and pair them, as well as give more flexibility for deployment options with peripherals that may not have user interface elements for configuration options.

In order to address such issues, embodiments herein can facilitate pairing operations through various interactions involving body area network communications such that three-way communication can be provided between a collaboration device controller, one or more collaboration devices, and a user device of a user that provides a body area network for the user in order to pair the collaboration device controller with the one or more collaboration devices within a workspace.

Figure 5:
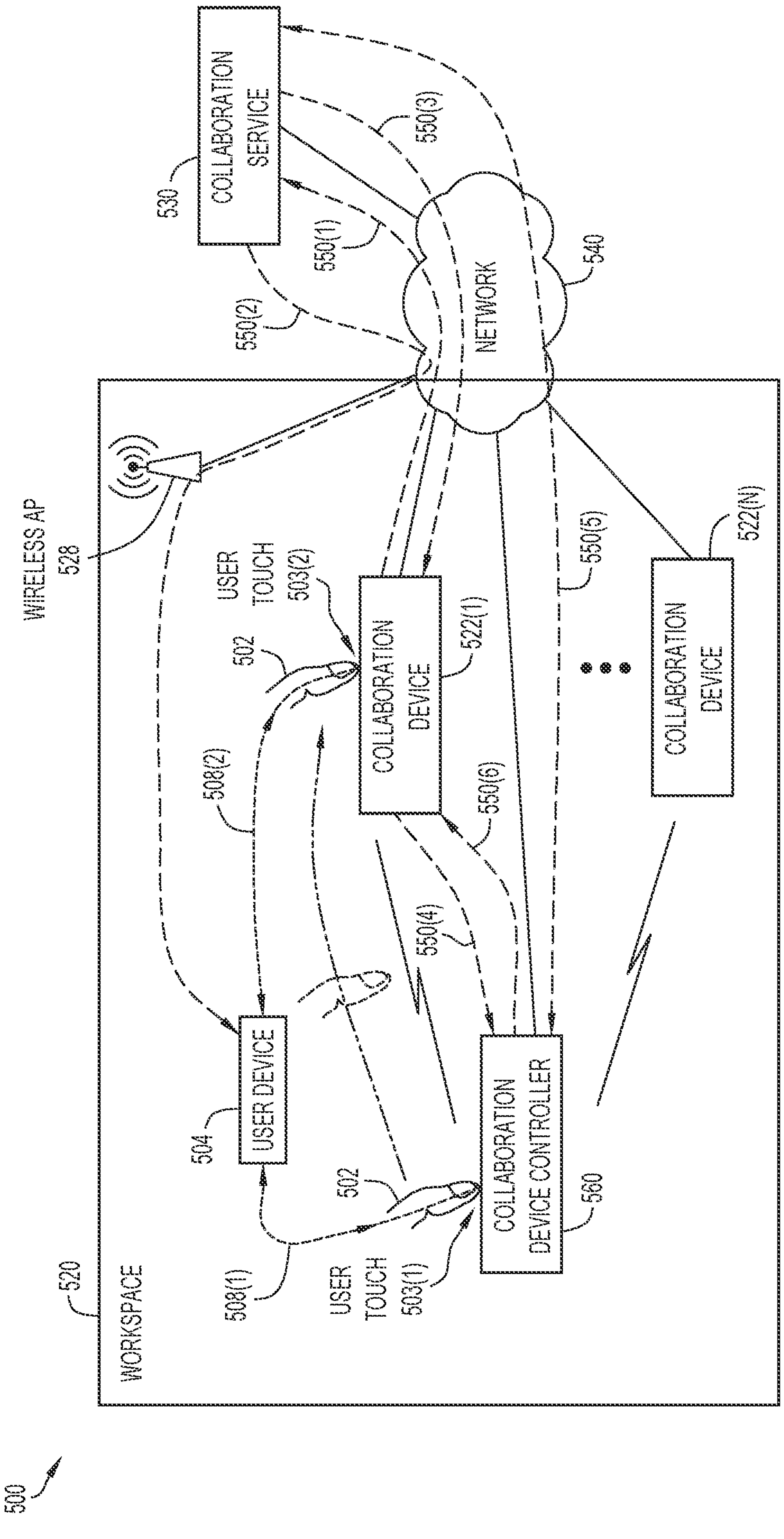
FIG. 5 is a block diagram of another system in which interactions with a collaboration device controller and one or more collaborative workspace devices can be facilitated through body area network communications in order to pair the collaboration device controller with the one or more collaboration devices, according to an example embodiment.

Consider, for example, FIG. 5, which is a block diagram of a system 500 in which interactions with a collaboration device controller 560 and one or more collaboration devices 522(1)-522(N) provided for a workspace 520 can be facilitated through body area network pairing communications facilitated via a user device 504 of a user 502 in order to pair the collaboration device controller 560 with the one or more collaboration devices 522(1)-522(N) via a collaboration service 530, in accordance with an example embodiment. Also shown in FIG. 5 is a wireless AP 528 and a network 540 in which each of the user device 504, wireless AP 528, collaboration device controller 560, collaboration devices 522(1)-522(N), and collaboration service 530 may interface via network 540.

For system 500, collaboration device controller 560 and collaboration devices 522(1)-522(N) may be configured with a collaboration application, BAN I/O (in combination with any of one or more touch screens and/or conductive interface elements to facilitate BAN communications), and network I/O in order to facilitate various pairing operations in combination with collaboration service 530 in accordance with embodiments herein. Further, user device 504 may be configured with a collaboration application, BAN I/O, and wireless network I/O in order to facilitate various pairing operations in accordance with embodiments herein.

Broadly, collaboration device controller 560 and collaboration device 522(1)-522(N) pairing operations can involve user 502 logging-in to the collaboration application configured for user device 504 using administrator credentials (e.g., username/password for an administrator account, which generates a user token/ID for the user 502) and thereafter performing a series of pairing touch interactions involving body area network communications in order to pair the collaboration device controller 560 and one or more of the collaboration devices 522(1)-522(N).

Figure 6:
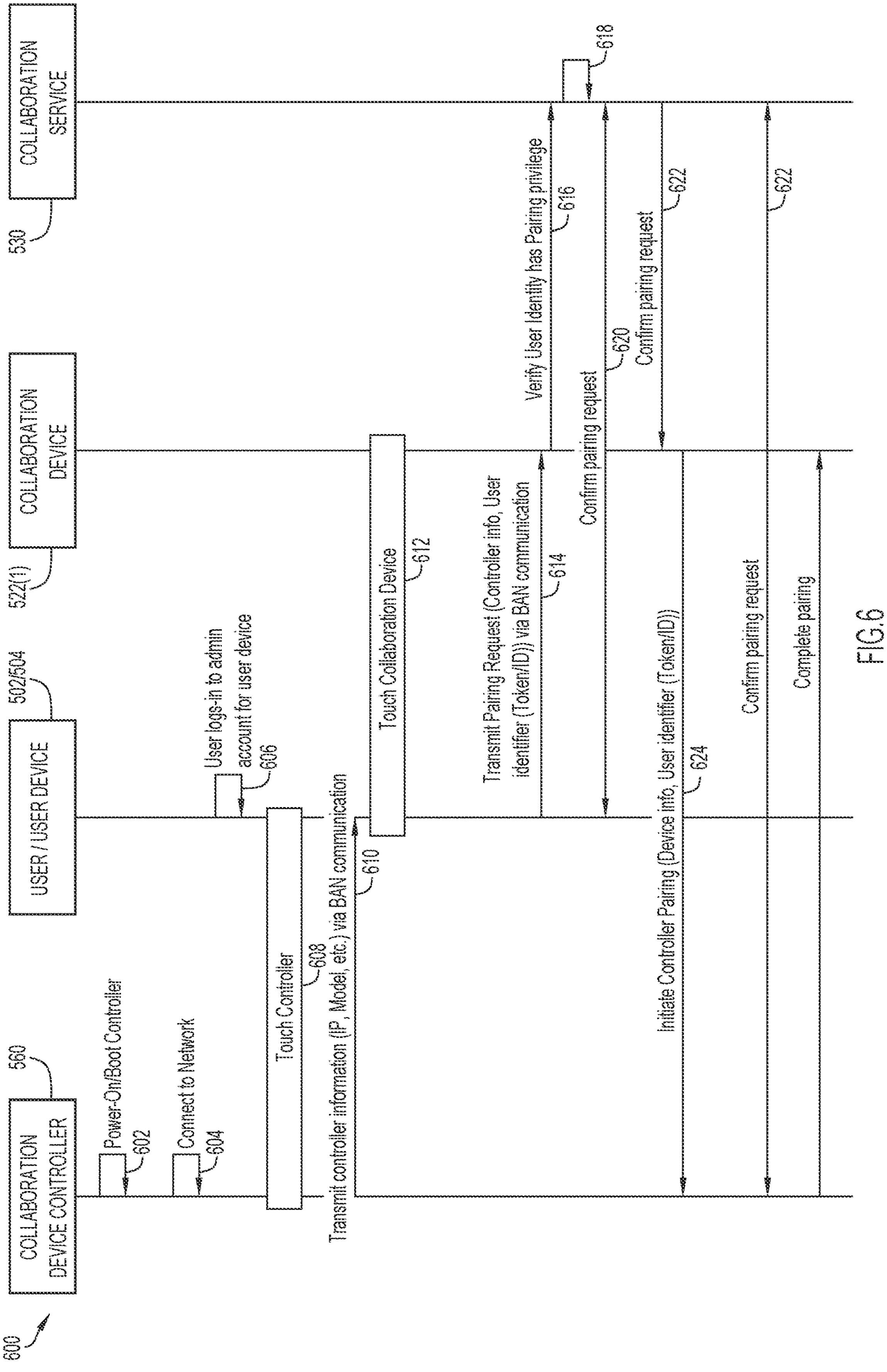
FIG. 6 is a ladder diagram illustrating various example pairing operations that can be utilized to facilitate pairing a collaboration device controller with at least one collaboration device for a workspace using various body area network communications, according to an example embodiment.

With reference to FIG. 6, which is a ladder diagram 600, consider various pairing operations that can be utilized to facilitate pairing collaboration device controller 560 with collaboration device 522(1) using various body area network communications, according to an example embodiment. FIG. 6 includes collaboration device controller 560, user 502, user device 504 (that is worn by/in contact with/held by user 502), collaboration device 522(1), and collaboration service 530 (e.g., a trusted admin portal). Operations illustrated in FIG. 6 are also discussed with reference to FIG. 5.

As shown at 602 and 604, consider that the collaboration device controller 560 is powered-on/booted and connected to the network 540 and is seeking to be paired with one or more collaboration devices. At 606, consider that user 502 logs-in to an administrator account for the collaboration application operating via user device 504 such that a user token/ID is generated for the user 502.

Next, consider various pairing operations that can be performed to facilitate pairing collaboration device controller 560 and collaboration device 522(1) in accordance with embodiments herein. At 608, the pairing operations may include the user 502 performing a first touch with the collaboration device controller 560 (as generally illustrated at 503(1) of FIG. 5) in order to obtain, by the user device 504 via body area network communications (as generally illustrated at 508(1) of FIG. 5 for a body area network connection established between the controller and the user device) during the first touch, pairing information transmitted from the collaboration device controller 560 to the user device, as shown at 610. The pairing information obtained for the collaboration device controller may include an IP address for the controller, a MAC address for the controller, model information for the controller, serial number information for the controller, and/or the like.

Thereafter, at 612, the pairing operations may include the user 502 performing a second touch with the collaboration device 522(1) (as generally illustrated at 503(2) of FIG. 5) in order to transmit a pairing request to the collaboration device 522(1) by the user device 504, as shown at 614, in which the pairing request is sent by the user device 504 during the second touch via body area network communications (as generally illustrated at 508(2) of FIG. 5) and includes the pairing information for the collaboration device controller 560 and an identifier for the user 502, such as the user token/ID, for pairing the collaboration device controller 560 with the particular collaboration device 522(1).

As shown at 616, the collaboration device 522(1) can then transmit a pairing communication to the collaboration service 530 (as generally illustrated at 550(1) of FIG. 5), in which the pairing communication may be an authentication request including the identifier for the user 502 and, optionally, the pairing information for the collaboration device controller 560 and/or pairing information for the collaboration device 522(1) that triggers the collaboration service 530, as shown at 618, to verify/confirm that the user 502 is authorized to pair the collaboration device controller 560 and the collaboration device 522(1) or, stated differently, has a 'pairing privilege' to pair the collaboration device controller 560 and the collaboration device 522(1).

As shown at 620, upon successful authentication of the user 502 by the collaboration service 530 (authenticating that the user 502 is authorized to pair the collaboration device controller 560 and the collaboration device 522(1)), the collaboration service 530 transmits, at 620, an indication (e.g., a pairing grant) to the user device 504 (as generally illustrated at 550(2) of FIG. 5, via wireless AP 528) confirming that the user 502 is authorized to pair the collaboration device controller 560 and the collaboration device 522(1).

Further, the collaboration service 530 transmits, at 622, an indication (e.g., pairing grant) to collaboration device 522(1) (as generally illustrated at 550(3) of FIG. 5) confirming that the user 502 is authorized to pair the collaboration device controller 560 and the collaboration device 522(1), which triggers the collaboration device 522(1), at 624, to transmit a pairing communication to the collaboration device controller 560 (e.g., a pairing request, as generally illustrated at 550(4) of FIG. 5) requesting to initiate/attempt pairing with the controller. The pairing communication (request) sent at 624 may include information for the collaboration device 522(1) (e.g., IP address, MAC address, serial number, etc.) and the identifier for the user 502.

As shown at 624, the collaboration device controller 560 can communicate with the collaboration service (as generally illustrated at 550(5) of FIG. 5) to confirm the pairing request initiated by the collaboration device 522(1). In at least one embodiment, the confirmation communication at 624 can include any combination of the controller information, the identifier for the user 502, and/or the collaboration device information. At 626, upon obtaining confirmation that the pairing is authorized, the collaboration device controller 560 can complete the pairing with the collaboration device 522(1) by transmitting a pairing confirmation to the collaboration device 522(1) (as generally illustrated at 550 (6) of FIG. 5).

Thus, as illustrated in FIGS. 5 and 6, user 502 via body area network communications involving user device 504 can direct peripheral devices to initiate pairing with a device/room controller, which the controller can accept in accordance with embodiments herein. Such techniques may provide the ability to quickly discover, authenticate, authorize, and pair peripheral devices to device/room controllers in a manner that removes the need to manually enter credentials for each of the controllers and peripheral devices with which pairing is desired.

Although the operations of FIGS. 5 and 6 are illustrated for one collaboration device, in some embodiments, user device 504 may facilitate multiple successive touches with multiple collaboration devices in order to pair each collaboration device with a given collaboration device controller. Further, for fixed devices that may be located too far apart for directly touching all at the same or close in time, user device 504 may facilitate delayed pairing operations that allow for some time to walk across a room and/or add multiple peripherals for pairing with a device controller. In some embodiments, user device 504 may be configured to time-out pairing operations if device touches, following a controller touch, are not performed within a threshold period of time and/or user device 504 may be configured such that user 502 could cancel pairing operations via a user interface (UI) provided via user device 504.

Pairing operations as discussed for embodiments herein that involve an authenticated device, such as user device 504, for facilitating the discovery of and granting of pairing access between a device/room controller and one or more peripheral devices utilizing body area network communications can prevent unauthorized pairing that may otherwise be triggered just by being near a peripheral device, as is often triggered for other multicast/wireless technologies such as multicast Domain Name System (mDNS) protocols, ultra-wideband (UWB), Bluetooth, ultrasound, etc. (e.g., that often find nearby devices that may not be intended to pair).

Although FIGS. 5 and 6 only illustrate one controller and multiple collaboration devices, it is to be understood that embodiments herein can also be utilized for scenarios in which multiple controllers (e.g., room controller/scheduler, device controller, etc.) can be paired with at least one collaboration device (e.g., video codec, etc.). Further, embodiments herein involving various BAN-based pairing operations can be performed using any sequence of pairing touches between controllers and collaboration device(s), so long as user authentication with a backend authorization service (e.g., collaboration service) is initiated by such collaboration device(s). For example, in at least one embodiment, a user may first touch a given collaboration device to facilitate a BAN connection/communication exchange with the collaboration device, then touch one or more controllers with which the device is to be paired to perform BAN connections/communication exchanges with each of the controller(s), and then again touch the given collaboration device to perform another BAN communication/exchange in order to trigger pairing the device with the controller(s). Other BAN-based pairing touch interactions/sequences can be envisioned.

By using body area network communications to trigger pairing operations, embodiments herein offer a deterministic approach for targeting devices to pair together as a user can physically touch the devices (rather having to guess/find the devices, as is often involve for Bluetooth pairing). Further, pairing operations as provided by embodiments herein advantageously utilize a user/user device's identity to facilitate granting of pairing access for pairing devices via an external authentication service/portal (e.g., via collaboration service 530), rather than performing pairing between two devices merely by being in physical location of the devices, which, in itself is not typically a sufficient authorize/allow pairing of devices. Thus, embodiments herein provide that pairing among collaboration devices and a device/room controller may be allowed through an authorized device, such as a user device of an admin user. Further, pairing operations as provided by embodiments herein advantageously obviate the need for generating/entering a PIN, exchanging certificates, creating credentials to share/manually enter across devices, and/or performing other manual entry steps to facilitate pairing a device/room controller and one or more peripheral collaboration devices.

Figure 7:
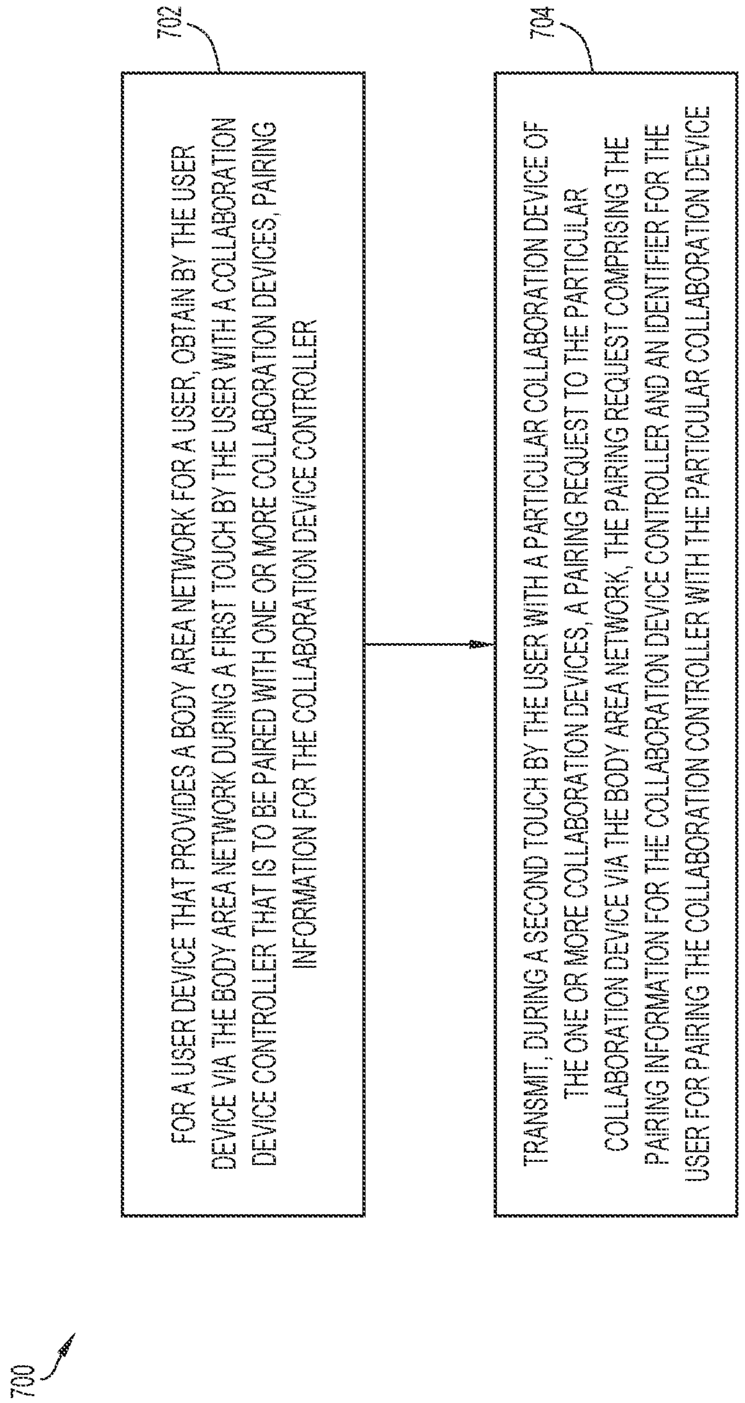
FIG. 7 is a flow diagram depicting a method associated with operations that may be performed to facilitate pairing a collaboration device controller with at least one collaboration device for a workspace using body area network communications, according to an example embodiment.

Referring to FIG. 7, FIG. 7 is a flow chart depicting a method 700 associated with operations that may utilized to facilitate pairing a collaboration device controller with at least one collaboration device using body area network communications, according to an example embodiment. In at least one embodiment, method 700 may be performed, at least in part, by a user device, such as any of user device 104, 204, and/or 504 as discussed for FIGS. 1-6, and/or any other user device facilitating a body area network in accordance with embodiments herein.

As shown at 702, the method may include, for a user device that provides a body area network for a user, obtaining by the user device via the body area network during a first touch by the user with a collaboration device controller that is to be paired with one or more collaboration devices, pairing information for the collaboration device controller. At 704, the method may include transmitting, during a second touch by the user with a particular collaboration device of the one or more collaboration devices, a pairing request to the particular collaboration device via the body area network, the pairing request comprising the pairing information for the collaboration device controller and an identifier for the user for pairing the collaboration controller with the particular collaboration device.

Although not shown in FIG. 7, the method may further include transmitting, by the particular collaboration device, an authentication request to a collaboration service, the authentication request comprising the identifier for the user, and, upon successful authentication of the user by the collaboration service, obtaining, by the particular collaboration device, an indication that the user is authorized to pair the collaboration device controller with the particular collaboration device. Upon obtaining the indication, transmitting, by the particular collaboration device, a pairing communication to the collaboration device controller, the pairing communication comprising the identifier for the user and pairing information for the particular collaboration device.

As noted above, embodiments herein may facilitate tailored experiences for user interactions with various workspace devices, such as collaboration device/room controllers and/or collaboration devices within a workspace, through the use of user privileges that can be obtained based on body area network communications. Such user privileges may be used, in some instances, to restrict privileged actions/controls/operations to only be provided for certain authorized users for certain devices.

There may be many scenarios in which it may be desirable to limit, restrict, or 'lock' certain actions from being accessed by certain users, such as locking administrator (admin) settings for devices, limiting certain meeting controls to admins/hosts, and/or providing user preferences and/or accessibility options for devices (e.g., for device UIs, etc.).

In one example, certain device/room controller features/controls, such as restarting, resetting to factory defaults, and/or resetting network settings for device/room controllers may be locked (e.g., by default) as admins typically do not desire non-authorized users from managing such features. If an admin wishes to allow access to such features, the admin typically has to unlock them on a device in order to allow others to access the features. Such an admin device unlock, however, does not limit the use of such features to any specific users; rather, the device itself is unlocked such that any users can access the features. The admin then has to re-lock the device to again restrict access to the features. In the case of meeting controls, such as initiating a recording of a meeting, managing participants, etc. are often limited until a host starts a meeting, at which time any participant within a workspace may perform such actions.

Regarding preferences and accessibility options, some users may have special needs, such as screen reading needs (e.g., larger font), localization needs, etc. Typically, changing the settings on a device or system to accommodate specific preferences/accessibility features of the device changes such settings for all users of the device/system but may be useful only to a limited number of users.

It would be advantageous to tailor user experiences for workspace devices, even if multiple users may have access to certain devices.

Embodiments herein provide novel techniques to allow users with appropriate privilege access levels to perform actions for workspace devices without any specific lock/unlock settings being pre-configured on the devices. Such embodiments may disallow access to such locked or limited actions for other (non-authorized) users without any specific lock/unlock settings being configured for devices by an administrator, even if the other (non-authorized) users are present in the same workspace while the actions are being accessed by users that do have the appropriate privileges.

Such embodiments can be facilitated through the use of body area network communications involving a user device of a user (e.g., a BYOD device of the user) and workspace devices, which may be inclusive of any combination of device/room controllers and/or workspaces devices within a workspace. Through body area network communications, a user token/ID of the user can be transmitted to a touched workspace device, which can trigger the device (or a device that the user desires to control) to obtain privileged information of the user (e.g., role and/or privileged information for the user) as the user touches a control interface (e.g., a control UI or screen) of the device.

The user token/ID can be authenticated via a collaboration service that manages a collaboration session for the device(s) using techniques as discussed for other embodiments herein such that, once authenticated, privilege information for the user can be provided to the device(s) in order to allow the user to access/control the device(s) according to the privileges/role of the user. In some instances, the user token/ID and associated privileges can be cached for a period of time on the device(s) such that multiple authentications with the collaboration service may be avoided.

Figure 8:
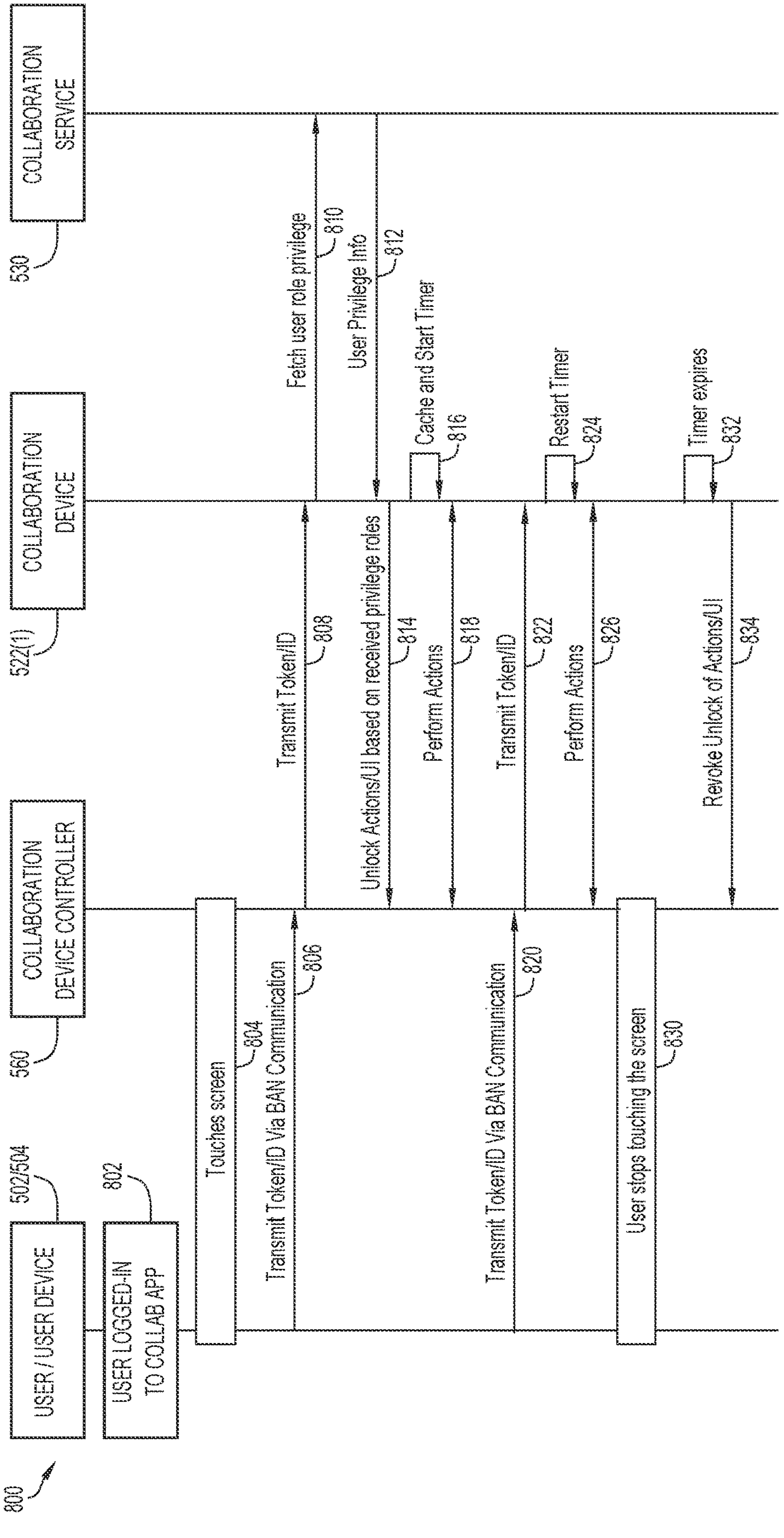
FIG. 8 is a ladder diagram illustrating various example operations that can be utilized to facilitate obtaining and utilizing user privileges for user interactions with workspace devices based on body area network communications, according to an example embodiment.

Consider various example operations as discussed in further detail with reference to FIG. 8, which is a ladder diagram 800 illustrating example operations that can be utilized to facilitate obtaining and utilizing user privileges for interactions with workspace devices based on body area network communications. FIG. 8 includes user 502/user device 504, collaboration device controller 560, collaboration device 522(1), and collaboration service 530.

For the embodiment of FIG. 8, consider that collaboration device controller 560 and collaboration device 522(1) have been previously paired together and that user 502 is logged-in to the collaboration application for user device 504 (as generally shown at 802) such that a user token/ID for the user 502 is stored via user device 504. For the example operations consider that the collaboration device 522(1) is a camera device controlled via the collaboration device controller 560 and that the user 502 desires to move/re-focus the camera to a particular participant within workspace 520 for a given collaboration session.

In this example, consider, as shown at 804 that user 502 touches a screen of the controller 560 and seeks to access the camera control UI. During the touch, as shown at 806, the user token/ID can be transmitted from the user device to the collaboration device controller 560 via the body area network provided for the user 502 by user device. The collaboration device controller 560, in turn as shown at 808, transmits the token/ID to the collaboration device 522(1), which can (using the token/ID) perform an authentication exchange with the collaboration service 530, as shown at 810 and 812 in order to obtain user privilege information for user 502 from the collaboration service 530. Upon determining, based on the privilege information, that the user 502 is authorized to control the camera (collaboration device 522(1), the camera can unlock the actions/UI for the controller, as shown at 814, to allow the user 502 to make perform the actions, as generally shown at 818.

In at least one embodiment, as shown at 816, the collaboration device 522(1) can initiate a timer and cache the user token/ID along with the privilege information for user 502 for a period of time. In the present example, consider that, at a later time (but within the timer period of the collaboration device 522(1)), the user 502 desires to re-adjust the camera and subsequently touches the UI/screen of the collaboration device controller 560 through which the user token/ID is again transmitted via body area network communications to the controller, as generally shown at 820, which triggers the controller to transmit the token/ID for user 502 to the camera (collaboration device 522(1)), as shown at 822. Since the camera previously cached the token/ID and the privilege information for user 502 (at 816), a subsequent authorization check is not needed for the user 502 and the camera can simply reset or restart the timer, as shown at 824 and the user 502 can perform the desired controls for the camera via collaboration device controller 560, as generally shown at 826.

Thereafter, as shown at 830, consider that user 502 stops touching the screen of the collaboration device controller

560 such that the timer expires, as shown at 832. By monitoring the timer, the camera (collaboration device 522 (1)) can determine, upon expiration of the timer, that the use privileges for user 502 are to be revoked and can send a communication to the collaboration device controller 560 revoking the unlock of the actions/UI involving the elevated access controls for the camera, as generally shown at 834. Further, the camera (collaboration device 522(1)) can purge or otherwise remove the user token/ID and associated privilege information previously obtained for the user 502 from the collaboration service 530. Following expiration of the timer and the purging, subsequent touches by the user for controlling such actions by the camera can again involve obtaining the privilege information for the user 502 from the collaboration service, as discussed above.

Such body area network interactions/communications for obtaining/confirming (and potentially caching) privilege information for one or more users for accessing one or more control actions of a collaboration device/room controller and/or collaboration device can be used for a variety of scenarios/use cases.

For example, if an admin user wants to factory reset or update network settings, the user can simply be logged into their BAN-capable user device in order to access such features. In accordance with embodiments herein, there is no need to unlock such settings from a control hub/admin controller for the device, no need to worry about an unauthorized user from adjusting the settings while the admin user is not touching the device or forgetting to re-lock such control settings; rather the admin user can access such control settings based on body area network communications provided during the touch of the device, which can trigger obtaining privilege information for the user and automatically unlocking the control settings for the admin user for the control touches performed by the admin user.

In another example, consider a scenario in which a host wants to admit a participant or start a recording for a collaboration session. In such a scenario if a participant started the meeting in the room with the controller paired to the device, host actions (e.g., record meeting, manage participant, etc.) may not be shown on the controller UI until a user with a host role for the meeting touches the controller, at which point the privilege information obtained for the user can be obtained and used to automatically unlock such actions for the controller. Such privileges may only be offered on the controller that the host is touching. Other participants who do not have host or panelist privilege would not be able to invoke such actions, even if the host dialed into the meeting, as the privileges can be downgraded based on the user that is touching the controller.

In another example, embodiments herein may facilitate the application of accessibility preferences (e.g., showing larger fonts, enabling a screen reader, etc.) based on the preferences of a user interacting with a device. Today, such accessibility changes are a configuration setting that is applied to a device regardless of the person using the device. However, through embodiments herein, such preferences can be triggered per-user, depending on who is touching/interacting with a device. If another user with no accessibility needs touches/interacts the device, the user would receive the normal UI experience. Thus, users can obtain their preferred experience on devices simply be interacting with the screen, without impacting the behavior on other peripherals.

In other examples, embodiments herein may facilitate the application of locale preferences (e.g., language, etc.), visualization of scheduling information (e.g., per-user calendar information), and/or any other user preference/user specific information that may be triggered through body area network interactions/communications for a user upon the user touching BAN-capable devices.

Thus, broadly, various body area network interactions as discussed for embodiments herein can be utilized to enable different capabilities and/or experiences for users based on touches with body area network capable devices without impacting the experiences of other devices/peripherals/screens that may be used within a workspace.

Figure 9:
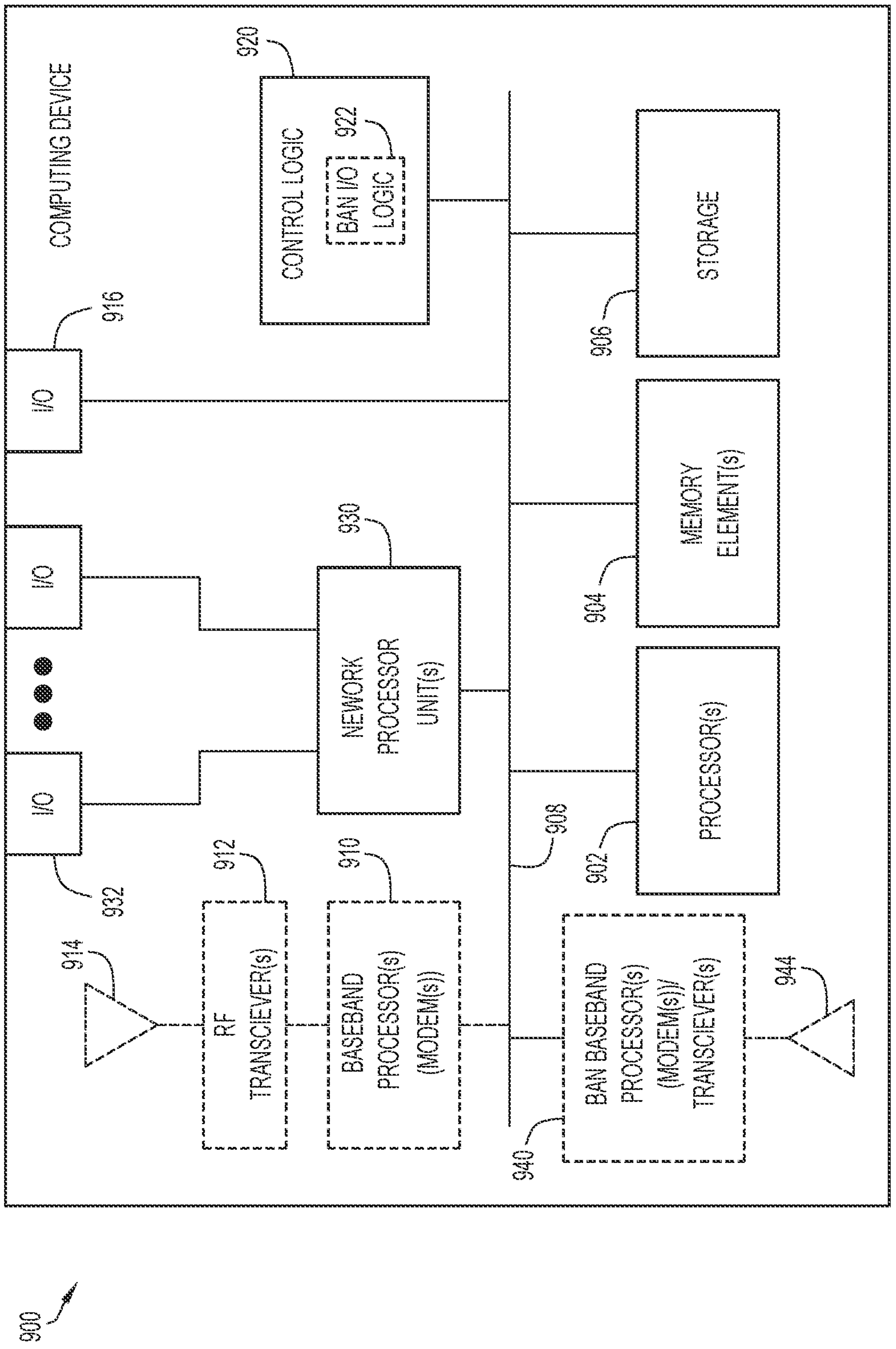
FIG. 9 illustrates a hardware block diagram of a computing device configured to perform functions associated with operations discussed in connection with embodiments herein.

Referring to FIG. 9, FIG. 9 illustrates a hardware block diagram of a computing device 900 that may perform functions associated with operations discussed herein in connection with the techniques described for embodiments herein. In various embodiments, a computing device or apparatus, such as computing device 900 or any combination of computing devices 900, may be configured as any entity/entities in order to perform operations of the various techniques discussed for embodiments herein, such as any elements, functions, etc. discussed for embodiments herein (e.g., user device 104, user device 204, user device 504, collaboration devices 122(1)-122(N), collaboration devices 522(1)-522(N), collaboration device controller 560, wireless AP 128, wireless AP 528, etc.).

In at least one embodiment, the computing device 900 may be any apparatus that may include one or more processor(s) 802, one or more memory element(s) 904, storage 906, a bus 908, one or more network processor unit(s) 930 interconnected with one or more network input/output (I/O) interface(s) 932, one or more I/O interface(s) 916, and control logic 920. In various embodiments, instructions associated with logic for computing device 900 can overlap in any manner and are not limited to the specific allocation of instructions and/or operations described herein.

For embodiments in which computing device 900 may be implemented as any device capable of wireless communications, computing device 900 may further include a baseband processor or modem 910, a radio RF transceiver 912 (e.g., any combination of RF receiver(s) and RF transmitter (s)), and antenna(s)/antenna array(s) 914.

For embodiments in which computing device 900 may be implemented as any device capable of body area network communications, computing device may further include any combination of a body area network (BAN) baseband processor or modem and/or BAN transceiver 940, antennas(s)/antenna arrays(s) and/or any other appropriate I/O communication device/element 944 (e.g., a conductive touch screen, conductive touch surface, or the like) and BAN I/O logic 922 configured for control logic 920.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920 and/or BAN I/O logic 922) can, in various embodiments, be stored for computing device 900 using any combination of memory element(s) 904 and/or storage 906. Note that in some embodiments, storage 906 can be consolidated with memory element(s) 904 (or vice versa) or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 930 may enable communication between computing device 900 and other systems, entities, etc., via network I/O interface(s) 932 (wired and/or wireless) to facilitate operations discussed for various embodiments described herein. In various embodiments, network processor unit(s) 930 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 932 can be configured as one or more Ethernet port(s), Fibre Channel ports, any other I/O port(s), and/or antenna(s)/antenna array(s) now known or hereafter developed. Thus, the network processor unit(s) 930 and/or network I/O interface(s) 932 may include suitable interfaces for receiving, transmitting, and/or otherwise communicating data and/or information (wired and/or wirelessly) in a network environment.

I/O interface(s) 916 allow for input and output of data and/or information with other entities that may be connected to computing device 900. For example, I/O interface(s) 916 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 900 is implemented as a wireless device or any apparatus capable of wireless communications, the RF transceiver 912 may perform RF transmission and RF reception of wireless signals via antenna(s)/antenna array(s) 914, and the baseband processor or modem 910 performs baseband modulation and demodulation, etc. associated with such signals to enable wireless communications for computing device 900.

For embodiments in which computing device 900 may be implemented as any device capable of body area network communications, the BAN baseband processor or modem and/or BAN transceiver 940, antennas(s)/antenna arrays(s) and/or any other appropriate I/O communication device/element 944 (e.g., a conductive touch screen, conductive touch surface, or the like), and BAN I/O logic 922 may facilitate transmission and reception of body area network communication signals in order to enable BAN communications for computing device 900.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920 and/or BAN I/O logic 922) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include, upon a touch of a user with a collaboration device, performing, for a user device that provides a body area network for the user, a pairing exchange for pairing the user device and the collaboration device, wherein the pairing exchange is facilitated via the body area network and comprises, during the touch of the user with the collaboration device, transmitting a user token to the collaboration device; transmitting a pairing communication to a collaboration service that manages a collaboration session with the collaboration device, the pairing communication comprising the user token and a pairing token for the collaboration device; and upon successful authentication of the user, by the collaboration service, based on the pairing communication, pairing the user device with the collaboration device.

In at least one instance, the pairing exchange further comprises obtaining, by the collaboration device, the pairing token for the collaboration device during the touch of the user with the collaboration device and transmitting the pairing communication is performed by the user device and does not involve the body area network and the pairing communication further comprises the pairing token. In at least one instance, transmitting the pairing communication is performed by collaboration device.

In at least one instance, the method may further include upon successful authentication of the user by the collaboration service, obtaining by the collaboration device, an indication of the successful authentication of the user device for pairing the user device and the collaboration device, wherein the indication comprises the user token. In at least one instance, the method may further include storing the user token by the collaboration device. In at least one instance, the indication further comprises one or more user policies, the one or more user policies enabling at least one of: one or more privileges that are enabled or disabled for the user for interacting with the collaboration device; or unique visual identification of the user for interactions by the user with the collaboration device.

In at least one instance, the collaboration device is a digital whiteboard, a first privilege of the one or more privileges disables touch interactions by the user with the digital whiteboard from adding or editing content to the digital whiteboard, and a second privilege of the one or more privileges enables touch interactions by the user for manipulating one or views of the digital whiteboard.

In at least one instance, the collaboration device is a digital whiteboard and at least one user policy of the one or more user policies enables the digital whiteboard to uniquely identify the user for touch interactions by the user with the digital whiteboard. In at least one instance, the touch interactions by the user with the digital whiteboard include transmitting the user token to the digital whiteboard by the user device via the body area network during the touch interactions by the user with the digital whiteboard. In at least one instance, the method may further include transmitting by the digital whiteboard to the collaboration service, the user token and data identifying the touch interactions by the user with the digital whiteboard.

In one form, another computer-implemented method is provided that may include, for a user device that provides a body area network for a user, obtaining by the user device via the body area network during a first touch by the user with a collaboration device controller that is to be paired with one or more collaboration devices, pairing information for the collaboration device controller; and transmitting, during a second touch by the user with a particular collaboration device of the one or more collaboration devices, a pairing request to the particular collaboration device via the body area network, the pairing request comprising the pairing information for the collaboration device controller and an identifier for the user for pairing the collaboration controller with the particular collaboration device.

In at least one instance, the method may further include transmitting, by the particular collaboration device, an authentication request to a collaboration service, the authentication request comprising the identifier for the user; and upon successful authentication of the user by the collaboration service, obtaining, by the particular collaboration device, an indication that the user is authorized to pair the collaboration device controller with the particular collaboration device.

In at least one instance, the method may further include, upon successful authentication of the user by the collaboration service, obtaining by the user device, the indication that the user is authorized to pair the collaboration device controller with the particular collaboration device. In at least one instance, the method may further include, upon obtaining the indication that the user is authorized to pair the collaboration device controller with the particular collaboration device, transmitting, by the particular collaboration device, a pairing request to the collaboration device controller, the pairing request comprising the identifier for the user and device information for the particular collaboration device. In at least one instance, the method may further include, upon confirming the pairing request with the collaboration service by the collaboration device controller, completing the pairing with the particular collaboration device.

In at least one instance, the method may further include following pairing the collaboration device controller with the particular collaboration device, for another user device that provides a body area network for another user, the method further comprising: obtaining by the collaboration device controller an identifier for the another user via the body area network during a touch by the another user with the collaboration device controller for controlling the particular collaboration device; and based on confirming via privilege information for the another user that the another user is authorized to access control actions for controlling the particular collaboration device, unlocking, via the collaboration device controller, one or more control actions for the particular collaboration device that can be performed by the another user via the collaboration device controller. In at least one instance, the method may further include based on confirming via privilege information for the another user that the another user is authorized to access control actions for controlling the particular collaboration device, storing the identifier for the user obtained during the touch and the privilege information for the another user. in at least one instance, the method may further include monitoring a timer, wherein the timer is restarted each time the another user initiates control of the particular collaboration device via one or more subsequent touches with the collaboration device controller; and upon determining expiration of the timer, removing the unlocking of the one or more control actions for the particular collaboration device that can be performed by the another user via the collaboration device controller.

Variations and Implementations

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

upon a touch of a user with a collaboration device, performing, for a user device that provides a body area network for the user, a pairing exchange for pairing the user device and the collaboration device, wherein the pairing exchange is facilitated via the body area network and comprises, during the touch of the user with the collaboration device, transmitting a user token to the collaboration device;

transmitting a pairing communication to a collaboration service that manages a collaboration session with the collaboration device, the pairing communication comprising the user token and a pairing token for the collaboration device;

upon successful authentication of the user by the collaboration service, based on the pairing communication, pairing the user device with the collaboration device; and during subsequent touch interactions of the user with the collaboration device, the collaboration device attributing collaborative content contributed by the user based on the user token.

2. The method of claim 1, wherein the pairing exchange further comprises obtaining, by the collaboration device, the pairing token for the collaboration device during the touch of the user with the collaboration device and transmitting the pairing communication is performed by the user device.

3. The method of claim 1, wherein transmitting the pairing communication is performed by the collaboration device.

4. The method of claim 1, further comprising:

upon successful authentication of the user by the collaboration service, obtaining by the collaboration device, an indication of the successful authentication of the user device for pairing the user device and the collaboration device, wherein the indication comprises the user token.

5. The method of claim 4, further comprising:

storing the user token by the collaboration device.

6. The method of claim 4, wherein the indication further comprises one or more user policies, the one or more user policies enabling at least one of:

one or more privileges that are enabled or disabled for the user for interacting with the collaboration device; or unique visual identification of the user for interactions by the user with the collaboration device.

7. The method of claim 6, the collaboration device is a digital whiteboard, a first privilege of the one or more privileges disables touch interactions by the user with the digital whiteboard from adding or editing content to the digital whiteboard, and a second privilege of the one or more privileges enables touch interactions by the user for manipulating one or more views of the digital whiteboard.

8. The method of claim 6, wherein the collaboration device is a digital whiteboard and at least one user policy of the one or more user policies enables the digital whiteboard to uniquely identify the user for touch interactions by the user with the digital whiteboard.

9. The method of claim 8, wherein the touch interactions by the user with the digital whiteboard include transmitting the user token to the digital whiteboard by the user device via the body area network during the touch interactions by the user with the digital whiteboard.

10. The method of claim 9, further comprising:

transmitting by the digital whiteboard to the collaboration service, the user token and data identifying the touch interactions by the user with the digital whiteboard.

11. A method comprising:

for a user device that provides a body area network for a user, obtaining by the user device via the body area network during a first touch by the user with a collaboration device controller that is to be paired with one or more collaboration devices, pairing information for the collaboration device controller;

transmitting, during a second touch by the user with a particular collaboration device of the one or more collaboration devices, a pairing request to the particular collaboration device via the body area network, the pairing request comprising the pairing information for the collaboration device controller and an identifier for the user for pairing the collaboration device controller with the particular collaboration device; and during subsequent touch interactions of the user with the particular collaboration device, the particular collaboration device attributing collaborative content contributed by the user.

12. The method of claim 11, further comprising:

transmitting, by the particular collaboration device, an authentication request to a collaboration service, the authentication request comprising the identifier for the user; and upon successful authentication of the user by the collaboration service, obtaining, by the particular collaboration device, an indication that the user is authorized to pair the collaboration device controller with the particular collaboration device.

13. The method of claim 12, further comprising:

upon obtaining the indication that the user is authorized to pair the collaboration device controller with the particular collaboration device, transmitting, by the particular collaboration device, a pairing request to the collaboration device controller, the pairing request comprising the identifier for the user and device information for the particular collaboration device.

14. The method of claim 13, further comprising:

upon confirming the pairing request with the collaboration service by the collaboration device controller, completing the pairing with the particular collaboration device.

15. The method of claim 11, following pairing the collaboration device controller with the particular collaboration device, for another user device that provides a body area network for another user, the method further comprising:

obtaining by the collaboration device controller an identifier for the another user via the body area network during a touch by the another user with the collaboration device controller for controlling the particular collaboration device; and based on confirming via privilege information for the another user that the another user is authorized to access control actions for controlling the particular collaboration device, unlocking, via the collaboration device controller, one or more control actions for the particular collaboration device that can be performed by the another user via the collaboration device controller.

16. The method of claim 15, further comprising:

based on confirming via privilege information for the another user that the another user is authorized to access control actions for controlling the particular collaboration device, storing the identifier for the user obtained during the touch and the privilege information for the another user.

17. The method of claim 16, further comprising:

monitoring a timer, wherein the timer is restarted each time the another user initiates control of the particular collaboration device via one or more subsequent touches with the collaboration device controller; and upon determining expiration of the timer, removing the unlocking of the one or more control actions for the particular collaboration device that can be performed by the another user via the collaboration device controller.

18. One or more non-transitory computer readable storage media encoded with instructions that, when executed by a processor, cause the processor to perform operations, comprising:

upon a touch of a user with a collaboration device, performing, for a user device that provides a body area network for the user, a pairing exchange for pairing the user device and the collaboration device, wherein the pairing exchange is facilitated via the body area network and comprises, during the touch of the user with the collaboration device, transmitting a user token to the collaboration device;

transmitting a pairing communication to a collaboration service that manages a collaboration session with the collaboration device, the pairing communication comprising the user token and a pairing token for the collaboration device;

upon successful authentication of the user by the collaboration service, based on the pairing communication, pairing the user device with the collaboration device; and during subsequent touch interactions of the user with the collaboration device, the collaboration device attributing collaborative content contributed by the user based on the user token.

19. The media of claim 18, wherein the pairing exchange further comprises obtaining, by the collaboration device, the pairing token for the collaboration device during the touch of the user with the collaboration device and transmitting the pairing communication is performed by the user device.

20. The method of claim 1, wherein the collaboration device is a digital whiteboard and wherein a plurality of privileges are enabled or disabled for the user for interacting with the digital whiteboard, the plurality of privileges including:

a first privilege of the plurality of privileges that enables or disables touch interactions by the user for manipulating a view of the digital whiteboard, and a second privilege of the plurality of privileges that enables or disables touch interactions by the user with the digital whiteboard for adding content or editing content to the digital whiteboard.

* * * * *